(12) United States Patent
Kaneko et al.

(10) Patent No.: US 6,236,815 B1
(45) Date of Patent: May 22, 2001

(54) IMAGE FORMING APPARATUS AND METHOD

(75) Inventors: Tokuharu Kaneko; Shokyo Koh, both of Mishima; Mitsuhiko Sato, Numazu; Yoshihito Osari, Shizuoka, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/210,799

(22) Filed: Dec. 15, 1998

(30) Foreign Application Priority Data

Dec. 17, 1997 (JP) ................................................... 9-348306

(51) Int. Cl.$^7$ .................................................... G03G 15/00
(52) U.S. Cl. .............................................. 399/45; 358/296
(58) Field of Search .................................. 399/45, 2, 411; 358/448, 452, 296, 300

(56) References Cited

U.S. PATENT DOCUMENTS

| | | | |
|---|---|---|---|
| 5,004,928 | * 4/1991 | Suzuki et al. ........................ | 250/559 |
| 5,072,304 | * 12/1991 | Abe et al. .............................. | 358/296 |
| 5,432,617 | * 7/1995 | Sugishima ............................. | 358/435 |
| 5,440,410 | * 8/1995 | Sugishima ............................. | 358/502 |
| 5,488,463 | 1/1996 | Nimura et al. ........................ | 355/322 |
| 5,717,501 | * 2/1998 | Iwamoto et al. ..................... | 358/468 |
| 5,781,823 | * 7/1998 | Isobe et al. ............................ | 399/2 |

* cited by examiner

*Primary Examiner*—Richard Moses
(74) *Attorney, Agent, or Firm*—Fitzpatrick, Cella, Harper & Scinto

(57) ABSTRACT

In an image forming apparatus for reversing/discharging sheets on which images are formed, control is performed to form mirror images on sheets and discharge the sheets, on which the mirror images are formed, without reversing them in accordance with the type of sheet on which images are to be formed, thereby adjusting the output order of the sheets without increasing the sheet output time and causing any damage on the sheet.

49 Claims, 15 Drawing Sheets

IMAGE FORMING APPARATUS AND METHOD

BACKGROUND OF THE INVENTION

1. Field of the Invention

The present invention relates to an image forming apparatus and method which are used to form an image on a sheet such as a transfer sheet.

2. Description of the Related Art

In a conventional image forming apparatus typified by a copying machine, when a plurality of originals are to be copied, they are copied from the last original, and each transfer sheet is discharged out of the machine with its image-bearing surface facing up. According to this copying method, the order of output sheets output outside the machine is kept the same as that of the originals by starting copying from the last original.

A composite copying machines having both printer and FAX functions has recently been developed. When this composite copying machine functions as a printer, information to be output is sequentially processed from the first page. As a result, the order of output sheets output out of the machine is reversed. For this reason, a mechanism of discharging sheets upon reversing them is added to the output unit of the copying machine to correct the order of output sheets by reversing/outputting them.

When the sheet reversing mechanism mounted on the output unit of the conventional copying machine is to be used, a sheet must be conveyed along a guide with a curvature, resulting in damage to the sheet. This makes it difficult to convey a sheet or damages the sheet depending on the type of sheet. When a sheet like an OHP sheet is used, the quality of the image formed on the sheet deteriorates owing to damage to the sheet.

SUMMARY OF THE INVENTION

It is an object of the present invention to provide an image forming apparatus and method which solve the above problem.

It is another object of the present invention to provide an image forming apparatus designed to reverse/discharge image-bearing sheets and a method therefor, which can output the sheets in a proper order without increasing the time required to output the sheets and damaging them.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the present invention will be described in detail below with reference to the accompanying drawings.

Figure 1:
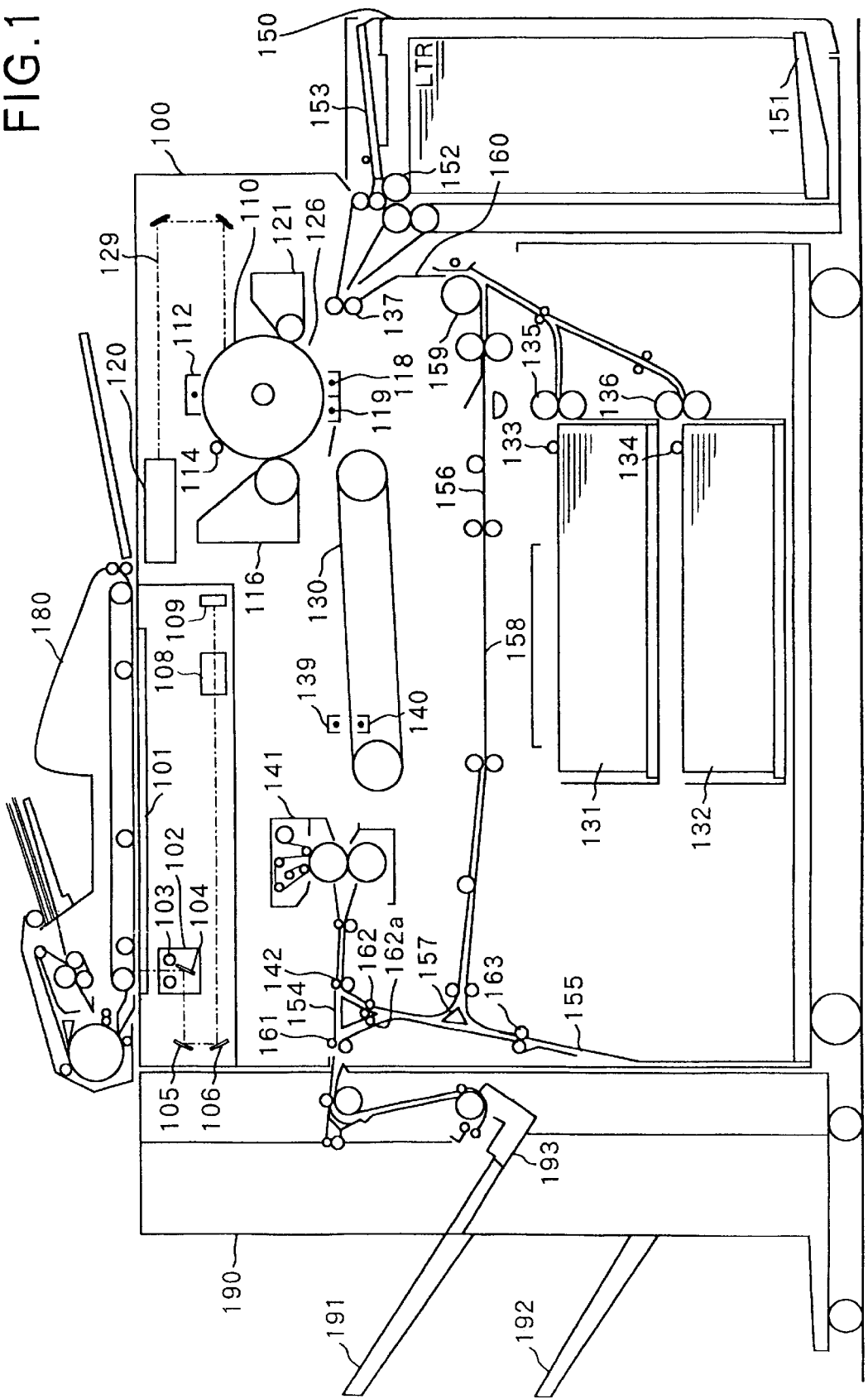
FIG. 1 is a sectional view showing the structure of an image forming apparatus according to an embodiment of the present invention.

FIG. 1 is a sectional view showing the structure of an image forming apparatus according to this embodiment. Referring to FIG. 1, reference numeral 100 denotes a copying machine body serving as an image forming apparatus; and 180, an automatic document feeder (DF).

Reference numeral 101 denotes a platen glass serving as an original table; and 102, a scanner made up of an original illumination lamp 103, a scanning mirror 104, and the like. The scanner 102 is reciprocally scanned in a predetermined direction by a motor (not shown), and reflected light 107 from an original is transmitted through a lens 108 and focused on a CCD sensor unit 109 through scanning mirrors 104 to 106.

Reference numeral 120 denotes an exposure control unit composed of a laser, a polygon scanner, and the like. The exposure control unit 120 irradiates a photosensitive drum 110 with a laser beam 129 modulated on the basis of an image signal that is converted into an electrical signal by the CCD sensor unit 109 and has undergone predetermined image processing (to be described later).

A primary charger 112, a developing unit 121, a transfer charger 118, a cleaning unit 116, and a pre-exposure lamp 114 are arranged around the photosensitive drum 110 to constitute an image forming unit 126. In the image forming unit 126, the photosensitive drum 110 is rotated by a motor (not shown) in the direction indicated by the arrow in FIG. 1. After the photosensitive drum 110 is charged to a desired potential by the primary charger 112, the photosensitive drum 110 is irradiated with the laser beam 129 from the exposure control unit 120. As a result, an electrostatic latent image is formed on the photosensitive drum 110. The electrostatic latent image formed on the photosensitive drum 110 is developed by the developing unit 121 to be visualized as a toner image.

Meanwhile, a transfer sheet fed from an upper cassette 131 or lower cassette 132 by pickup rollers 133 and 134 is fed to the main body by paper feed rollers 135 and 136. The transfer sheet is then fed to a transfer belt by registration rollers 137, and the visualized toner image is transferred onto the transfer sheet by the transfer charger 118. Any residual toner on the photosensitive drum 110 after transfer is cleaned by the cleaning unit 116, and any residual charge is eliminated by the pre-exposure lamp 114.

The transfer sheet after transfer is separated to be conveyed to a transfer belt 130, and the toner image is re-charged by pre-fixing chargers 139 and 140. The sheet is then sent to a fixing unit 141, in which the image is fixed by pressure and heat. The resultant sheet is discharged out of the main body 100 by paper discharge rollers 142.

Reference numeral 138 denotes a chucking charger for chucking the transfer sheet sent from the registration rollers 137 on the transfer belt 130; and 139, a transfer belt roller that is used to rotate the transfer belt 130 and paired with the chucking charger 138 to chuck/charge the transfer sheet on the transfer belt 130.

A deck 150 capable of storing, for example, 4,000 transfer sheets is mounted on the main body 100. A lifter 151 of the deck 150 rises in accordance with the number of transfer sheets to keep a transfer sheet in contact with a paper feed roller 152. In addition, a manual multi insertion unit 153 capable of storing 100 transfer sheets is mounted on the main body.

Reference numeral 154 denotes a paper discharge flapper for switching between the double-sided printing/multi-recording route and the paper discharge route. The transfer sheet fed by the paper discharge rollers 142 is switched to the double-sided printing/multi-printing route by the paper discharge flapper 154. Reference numeral 158 denotes a lower convey path for guiding the transfer sheet fed from the paper discharge rollers 142 to a re-feed tray 156 while turning the sheet upside down through a reverse path 155; and 157, a multi-flapper for switching between the double-sided printing route and the multi-printing route. When this multi-flapper 157 is tilted to the left, the transfer sheet is directly guided to the lower convey path 158 without mediacy of the reverse path 155. Reference numeral 159 denotes a paper feed roller for feeding the transfer sheet toward the image forming unit 126 through a route 160; and 161, paper discharge rollers disposed near the paper discharge flapper 154 to discharge the transfer sheet, switched to the paper discharge side by the paper discharge flapper 154, out of the machine. When double-sided printing (double-sided copying) or multi-printing (multi-copying) is to be performed, the paper discharge flapper 154 is raised upward, and the transfer sheet having undergone copying is stored in the re-feed tray 156 through the covey paths 155 and 158 while being turned upside down. In double-sided printing, the multi-flapper 157 is tilted to the right. In multi-printing, transfer sheets stored in the re-feed tray 156 are guided one by one to the registration rollers 137 of the main body by the paper feed roller 159 through the route 160.

A transfer sheet is discharged from the main body while being turned upside down as follows. The paper discharge flapper 154 is raised upward, and the multi-flapper 157 is tilted to the right. The transfer sheet having undergone copying is then conveyed toward the convey path 155. After the trailing edge of the transfer sheet passes through first feed rollers 162, the sheet is conveyed toward the second feed rollers by reverse rollers 163. The transfer sheet is reversed and discharged out of the machine by the paper discharge rollers 161.

Reference numeral 190 denotes a paper discharge processing unit for registering and stapling transfer sheets discharged from the image forming apparatus 100. Transfer sheets discharged one by one are stacked on a process tray 193 to be registered. Upon completion of discharging of some image-bearing sheets, a bundle of transfer sheets is stapled and discharged onto a paper discharge tray 191 or 192. The movement of the paper discharge trays 191 and 192 is controlled by a motor (not shown) such that a tray on which transfer sheets are to be stacked is moved to the position of the process tray before image forming operation.

Figure 2:
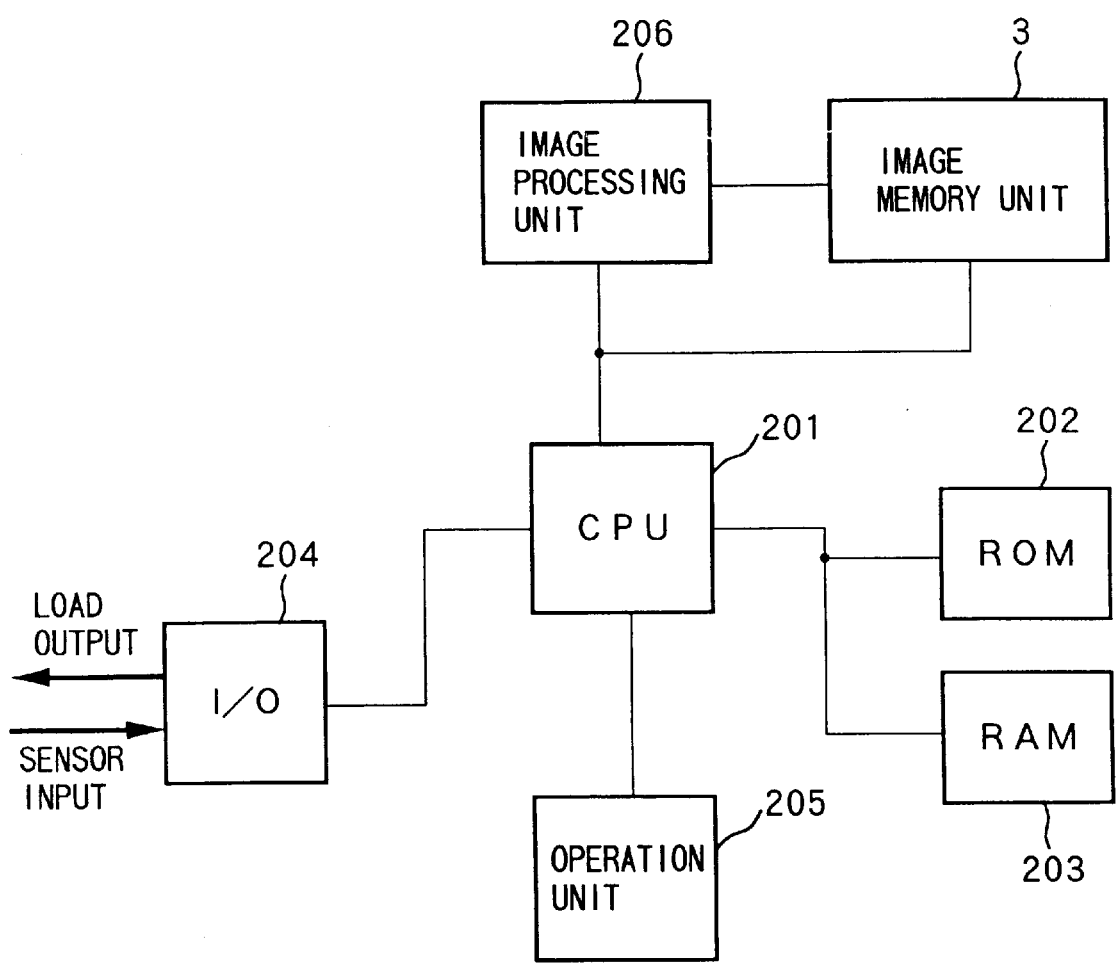
FIG. 2 is a block diagram showing the control system of the image forming apparatus according to this embodiment.

FIG. 2 is a block diagram showing the control system of the image forming apparatus of this embodiment. Referring to FIG. 2, reference numeral 201 denotes a CPU for performing basic control on this image forming apparatus 100. A ROM 202 in which control programs and the like are written, a work RAM 203 used by the CPU 201 to perform processing, and an input/output port 204 are connected to the CPU 201 through address and data buses. The input terminals (not shown) of various loads (not shown) such as a motor and clutch for controlling the image forming apparatus 100, a sensor for detecting the position of a paper sheet, and the like are connected to the input/output port 204.

In this case, the CPU 201 sequentially controls input/output operations through the input/output port 204 in accordance with the contents of the ROM 202, thereby controlling image forming operation. An operation unit 205 is also connected to the CPU 201. The CPU 201 controls the display means and key input means of the operation unit 205. The operator instructs the CPU 201 through the key input means to switch the image formation modes and display modes. The CPU 201 then displays the state of the image forming apparatus 100 or the operation mode set by key input operation on the display means. An image processing unit 206 for processing an electrical signal obtained by the CCD sensor unit 109 and an image memory unit 3 for storing processed image data are connected to the CPU 201.

Figure 3:
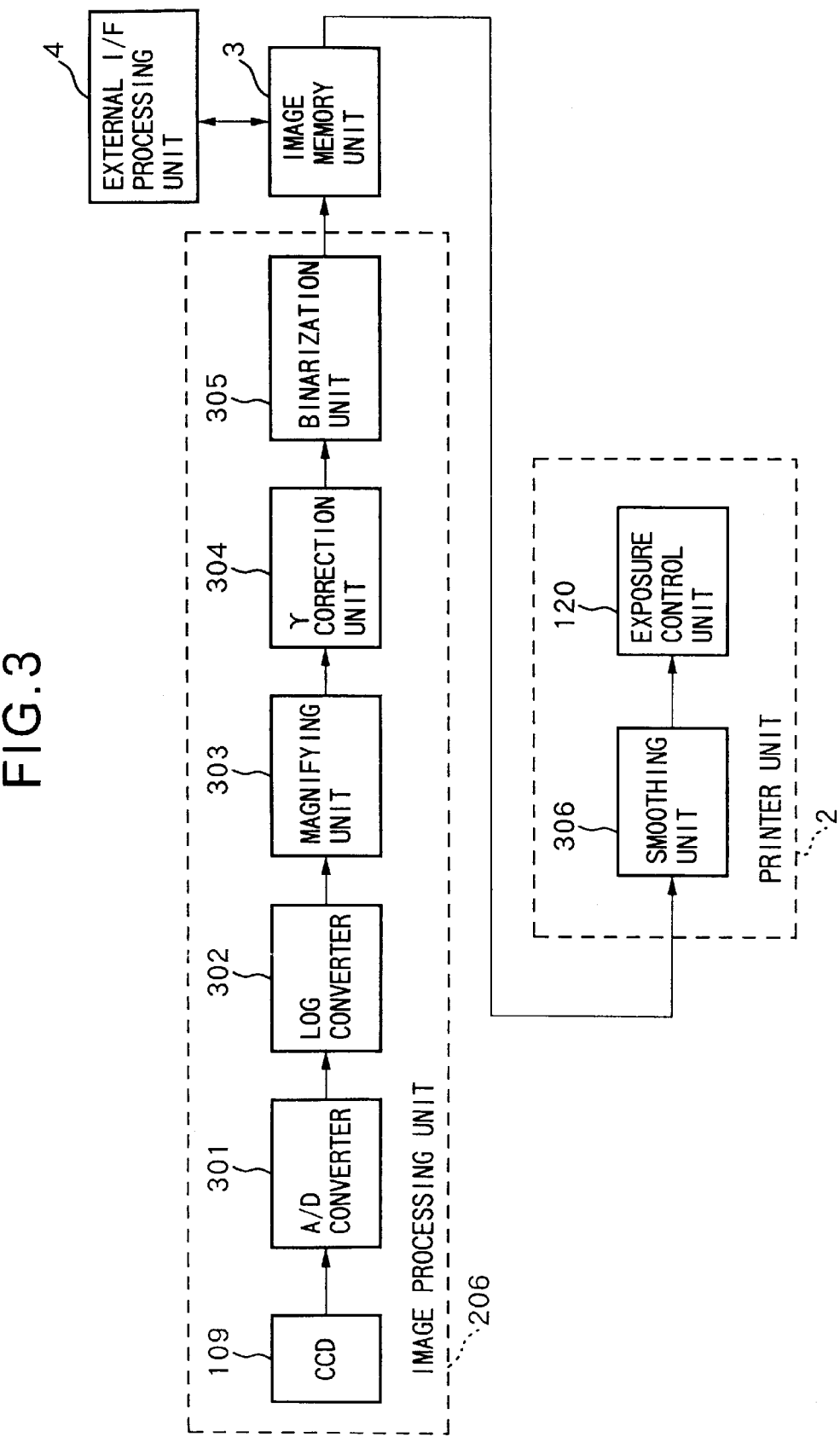
FIG. 3 is a block diagram showing the detailed arrangement of an image processing unit 206 in this embodiment.

The arrangement and operation of the image processing unit 206 will be described in detail next. FIG. 3 is a block diagram showing the detailed arrangement of the image processing unit 206 in this embodiment. The original image formed on the CCD sensor unit 109 through the lens 108 is input as black luminance data and converted into an analog electrical signal by the CCD sensor unit 109. The converted image information is input to an analog signal processing unit (not shown) to undergo sample/hold processing, dark level correction, and the like. The resultant data undergoes analog/digital conversion (A/D conversion) in an A/D converter 301, and shading correction (correction of variations in output from a sensor for reading originals and luminous intensity distribution characteristics of an original illumination lamp) of the digital signal is performed. The resultant data is sent to a log converter 302.

The log converter 302 stores a look-up table (LUT) for converting input luminance data into density data, and converts luminance data into density data by outputting a table value corresponding to input data. The image is then magnified at a desired magnification by a magnifying unit 303 and is input to a γ correction unit 304. In outputting density data, the γ correction unit 304 performs conversion based on the LUT in consideration of the characteristics of the printer, and adjusts the output in accordance with the density value set by the operation unit 205. The resultant data is sent to a binarization unit 305. The binarization unit 305 binarizes the multivalued density data. As a result, the density value is expressed by "0" or "255". This 8-bit image data is binarized into 1-bit image data of "0" or "1". This reduces the amount of image data to be stored in the memory.

If, however, image data is binarized, the number of shades of gray of the image changes from 256 to 2. For this reason, when image data containing much halftone data, like photographic image data, is binarized, a considerable deterioration in image quality generally occurs. Pseudo-halftone expression using binary data is therefore required. Error diffusion is used as a method of implementing pseudo-halftone expression using binary data. In this method, binarization is performed such that given image data having a density higher than a given threshold is regarded as density data of "255", and given image data having a density equal to or lower than the threshold is regarded as density data of "0". Thereafter, the differences between the actual density data and the binarized data are distributed as error signals to neighboring pixels. This error distribution is done by multiplying the errors produced by binarization with weighting coefficients on a prepared matrix, and adding the products to neighboring pixels. With this operation, the average density of the overall image data is maintained to allow pseudo-halftone expression.

The binarized image data is sent to an image memory unit 3 to be stored therein. The image data input from an external computer through an external I/F processing unit 4 is processed as binary image data by the external I/F processing unit 4, and hence is directly sent to the image memory unit 3. The image memory unit 3 has a high-speed page memory and a large-capacity memory (hard disk) capable of storing a plurality of page image data.

The plurality of image data stored in the hard disk are output in the order corresponding to the edit mode designated by the operation unit 205 of the image forming apparatus 100. In the sort mode, for example, the image data of a bundle of originals that are read from the DF 180 are sequentially output. When the original image data temporarily stored in the hard disk are read out and repeatedly output, the function of a sorter having a plurality of bins can be obtained. The image data output from the image memory unit 3 is sent to a smoothing unit 306 of a printer unit 2. The smoothing unit 306 interpolates the data to make the edge portions of the binarized image data smooth, and outputs the resultant image data to the exposure control unit 120. The exposure control unit 120 forms the image data on a transfer sheet by the processing described above.

Figure 4:
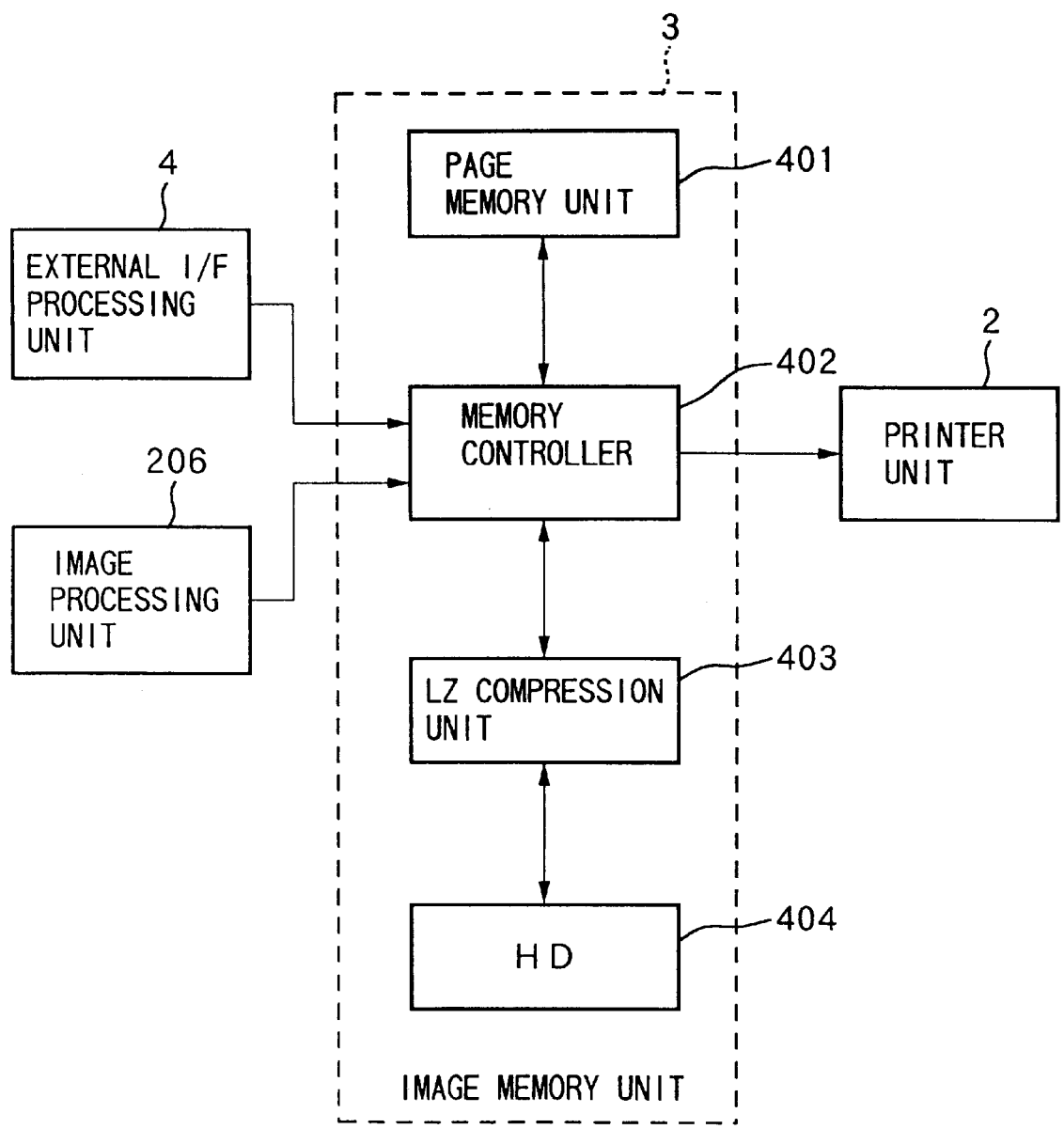
FIG. 4 is a block diagram showing the arrangement of an image memory unit 3 in this embodiment.

The image memory unit 3 will be described further in detail next. FIG. 4 shows the arrangement of the image memory unit 3 in this embodiment. In the image memory unit 3, for example, accesses are made through a memory controller unit 402 to write binary image data from the external I/F processing unit 4 or an image processing unit 170 into a page memory unit 401 formed from a DRAM or the like, output image data to the printer unit 2, and input/output the image data compressed/decompressed by an LZ compression unit 403 to/from a hard disk 404 as a large-capacity memory. In this case, the memory controller unit 402 generates DRAM refresh signals for the page memory unit 401, and arbitrates accesses from the external I/F processing unit 4, the image processing unit 170, and the hard disk 404 to the page memory unit 401. In addition, the memory controller unit 402 controls the write and read addresses for the page memory unit 401, the read direction, and the like in accordance with instructions from the CPU 201. If, for example, the mirror image mode to be described later is set, data from the page memory unit 401 can be converted into mirror image data by reversing the main scanning direction of the read addresses for the page memory unit 401 under the control of the memory controller unit 402. Alternatively, the sub-scanning direction of addresses may be reversed. Also, the write addresses for the page memory unit 401 may be reversed with respect to the read addresses.

With this operation, the CPU 201 can control the function of laying out a plurality of original images in the page memory unit 401 and outputting them to the printer unit 2, the function of cutting only a portion of an image and outputting it, the image rotating function, the mirror image conversion function, and the like.

Figure 5:
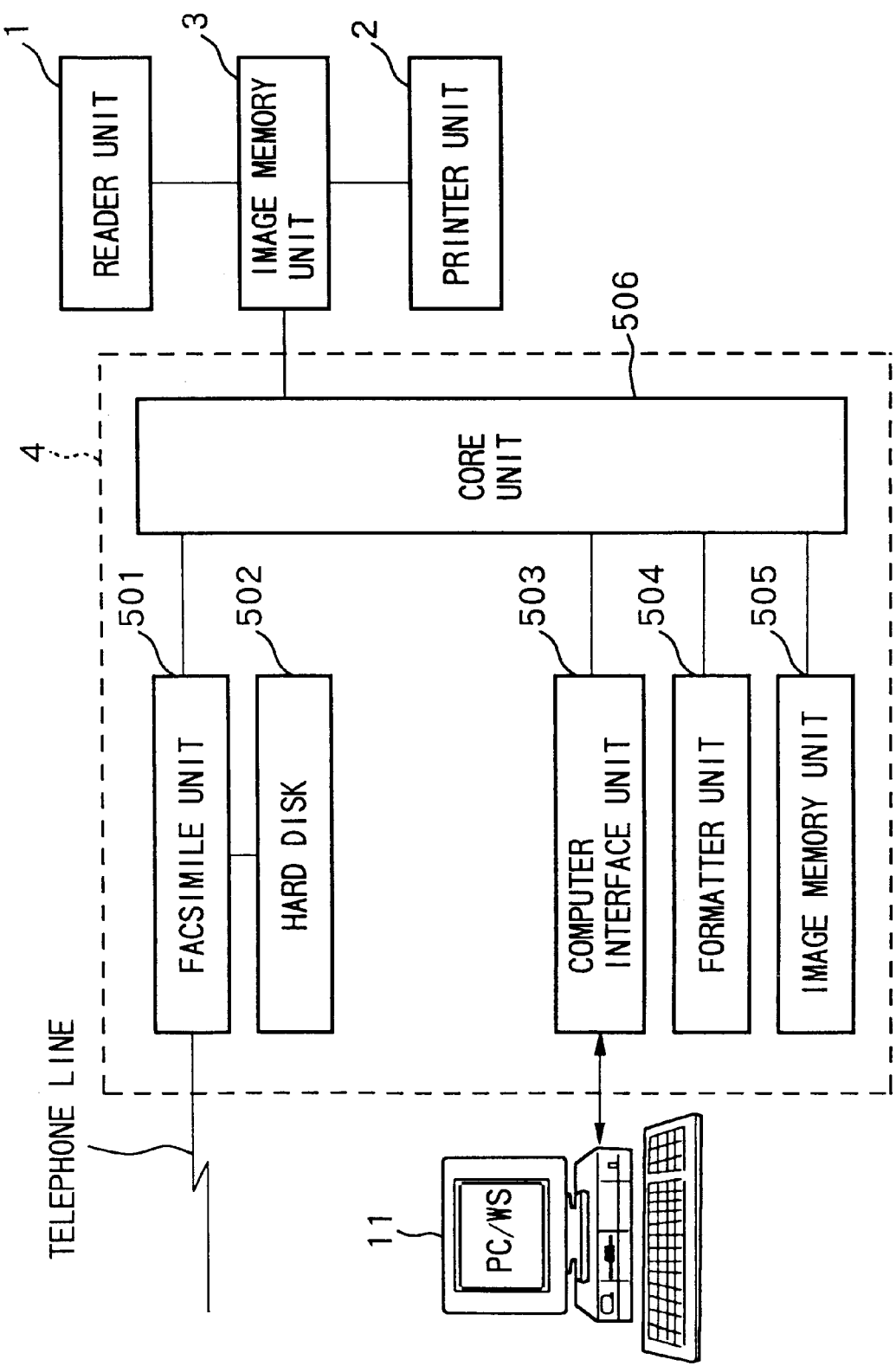
FIG. 5 is a block diagram showing the arrangement of an external I/F processing unit 4 in this embodiment.

The external I/F processing unit 4 will be described further in detail next. FIG. 5 shows the arrangement of the external I/F processing unit 4 in this embodiment. As shown in FIG. 5, the external I/F processing unit 4 receives the binary image data read by a reader unit 1 through the image memory unit 3, and outputs binary image data to the printer unit 2 through the image memory unit 3 so as to form an image.

The external I/F processing unit 4 includes a facsimile unit 501, a hard disk 502 for storing image data to be communicated by the facsimile unit 501, a computer interface unit 503 connected to a computer 11 such as a personal computer or work station (PC/WS), a formatter unit 504, an image memory unit 505, and a core unit 506. The respective units will be sequentially described below.

The facsimile unit 501 is connected to a public line through a modem (not shown) and transmits/receives facsimile communication data to/from a distant apparatus through the public line. The facsimile unit 501 stores fax image data in the hard disk 502 and processes it to perform the facsimile function, i.e., performing facsimile transmission at a designated time or transmitting image data in response to a request from a distant apparatus using a designated password. With this operation, once image data is transferred from the reader unit 1 to the facsimile unit 501 and the hard disk 502 for facsimile through the image memory unit 3, the data from the reader unit 1 and the image memory unit 3 can be faxed without using the facsimile function.

The computer interface unit 503 is an interface for communicating data with the computer 11, and has a local area network (LAN), a serial I/F, a SCSI I/F, and a centronics I/F, and the like. Information indicating the states of the printer unit 2 and the reader unit 1 is given to the computer 11 through the computer interface unit 503, or the image data read by the reader unit 1 is transferred to the external computer 11 through the computer interface unit 503 in accordance with an instruction from the external computer 11. In addition, the computer interface unit 503 receives print image data from the external computer 11.

The print data received from the external computer 11 through the computer interface unit 503 is described in a dedicated printer code. The formatter unit 504 therefore converts this code into raster image data used by the printer unit 2 to form an image through the image memory unit 3. The formatter unit 504 performs rasterization of image data in the image memory unit 505.

The image memory unit 505 is used as a memory for rasterization by the formatter unit 504 described above. The image memory unit 505 is also used as follows when image data from the reader unit 1 is to be sent to the external computer 11 through the computer interface unit 503 (image scanner function). After the image data sent from the image memory unit 3 is rasterized in the image memory unit 505, the data is converted into data in the form suited to transmission to the external computer 11, and the converted data is sent from the computer interface unit 503.

The core unit 506 controls/manages data transfer between the facsimile unit 501, the computer interface unit 503, the formatter unit 504, the image memory unit 505, and the image memory unit 3. With this operation, even if a plurality of image output units are connected to the external I/F processing unit 4, and only one image transfer path extends to the image memory unit 3, image data is output while exclusive control and priority control are performed by the smoothing unit 306.

Figure 6:
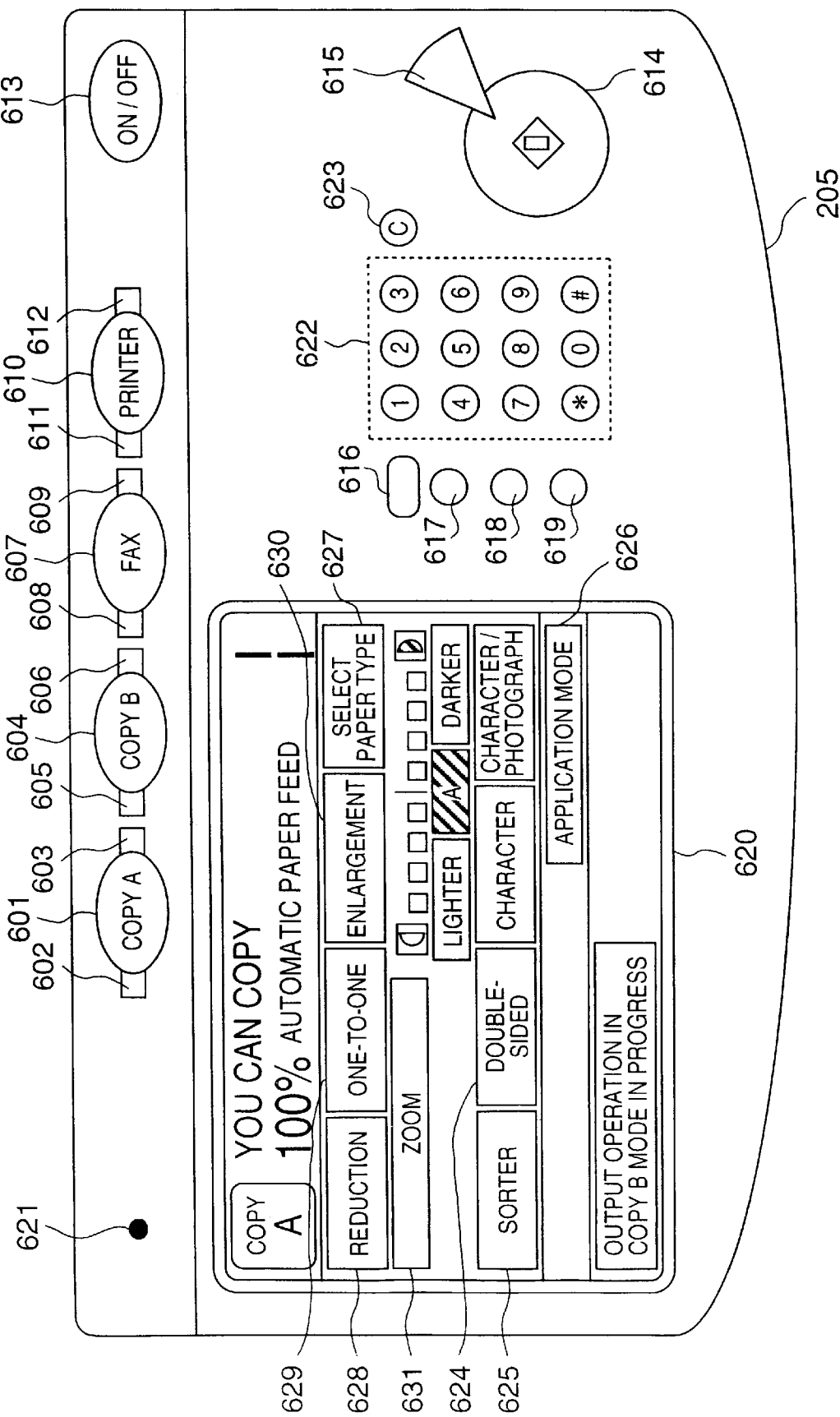
FIG. 6 is a view showing the arrangement of an operation unit 205 in this embodiment.

The operation unit for setting copying operation in the image forming apparatus will be described next. FIG. 6 shows the arrangement of the operation unit 205 in this embodiment. Referring to FIG. 6, reference numeral 621 denotes a power lamp for indicating a power-on state. The power lamp 621 is turned on/off in accordance with ON/OFF operation of the power by means of a power switch 613. Reference numeral 622 denotes a ten-key pad that is used to set the number of copies or input numerical values in mode setting. On a facsimile setting window, the ten-key pad 622 is used to input a telephone number. Reference numeral 623 denotes a clear key used to clear the settings input with the ten-key pad 622; 616, a reset key used to reset the set number of copies, the operation mode, the selected type of paper to be fed, and the like; and 614, a start key that is depressed to start image forming operation. Red and green LEDs (not shown) for indicating whether operation can be started or not are located in the center of the start key 614. When operation cannot be started, the red LED is turned on. When operation can be started, the green LED is turned on.

Reference numeral 615 denotes a stop key used to stop copying operation; and 617, a guide key. When the guide key 617 is depressed first, and then another key is depressed, a description of the function that can be set by the key is displayed on the display panel. This guide display is canceled by depressing the guide key 617 again. Reference numeral 618 denotes a user setting key. When this key is depressed, the user can change the settings in the image forming apparatus. The settings that the user can change include the time that elapses before a given setting is automatically cleared, the defaults in a given mode set upon depression of the reset key 616, and the like. Reference numeral 619 denotes an interruption key. When this key is depressed during image forming operation, the image forming operation is interrupted, and copying operation can be performed without using the automatic document feeder 180.

Figure 7:
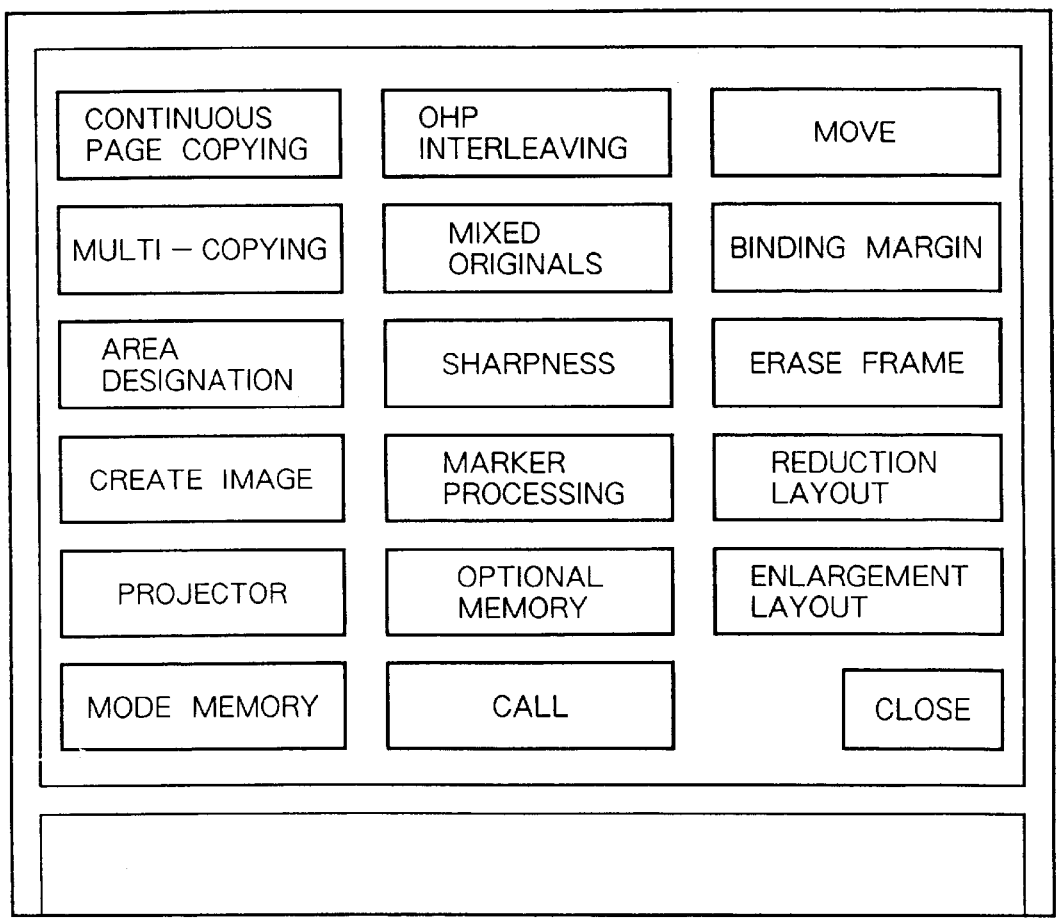
FIG. 7 is a view showing a window for setting application function modes in the image forming apparatus.

Reference numeral 620 denotes a display panel made up of a liquid crystal and the like. The contents displayed on the display panel 620 change in accordance with the set mode to facilitate detailed mode setting. The surface of the display panel serves as a touch sensor. FIG. 6 shows a setting window for the copying operation mode. Referring to FIG. 6, keys 624 to 631 are displayed within the display panel 620. When the user touches the display position of one of these keys, the depression of the key is determined to set a corresponding mode. Reference numeral 627 denotes a selection key. When this key is depressed, information for setting a specific one of the cassettes 131 and 132 from which paper sheets are to be fed is displayed on the display panel 620. Reference numerals 628 to 631 denote keys for setting the magnification in copying operation. The key 626 is a key for setting an application mode. When this key is depressed, a window for setting application function modes such as a multi-printing mode, a reduction layout mode, and a cover/interleaving paper mode is displayed on the display panel. For example, keys for setting the respective application modes are displayed, as shown in FIG. 7, thereby allowing the user to set application modes.

Reference numeral 624 denotes a key for setting double-sided operation. For example, this key is used to set three types of double-sided modes, namely "single-sided to double-sided mode" of outputting image data from a single-sided original to a double-sided sheet, "double-sided to double-sided mode" of outputting image data from a double-sided original to a double-sided sheet, and "double-sided to single-sided mode" of outputting image data from a double-sided original to two single-sided sheets. Reference numeral 625 denotes a sort key. This key is depressed to set an operation mode for the paper discharge processing unit 190 or the mode of sorting output sheets by using an image memory. In addition to normal display of the keys on the display panel, the following display is performed. When the mode corresponding to a given displayed key cannot be set, the line of the key is displayed in a dotted line (halftone) to indicate that the key cannot be operated.

In the case shown in FIG. 6, the set contents of copying operation, the current operation state, and the like are displayed on the upper portion of the display panel 620. In addition, information indicating a specific one of the function modes (to be described later) to which the display window corresponds is displayed on the upper left of the window. In the case shown in FIG. 6, the setting window corresponding to "copy A" is displayed. Although this mode is indicated by the characters, each mode may be expressed by symbols. In addition, on the lower portion of the display panel 620, the operation state of another function mode (to be described later) is displayed within the range in which information can be expressed by one line. In the case shown in FIG. 6, information indicating that data is being output to the printer unit 2 corresponding to "copy B".

Figure 8A:
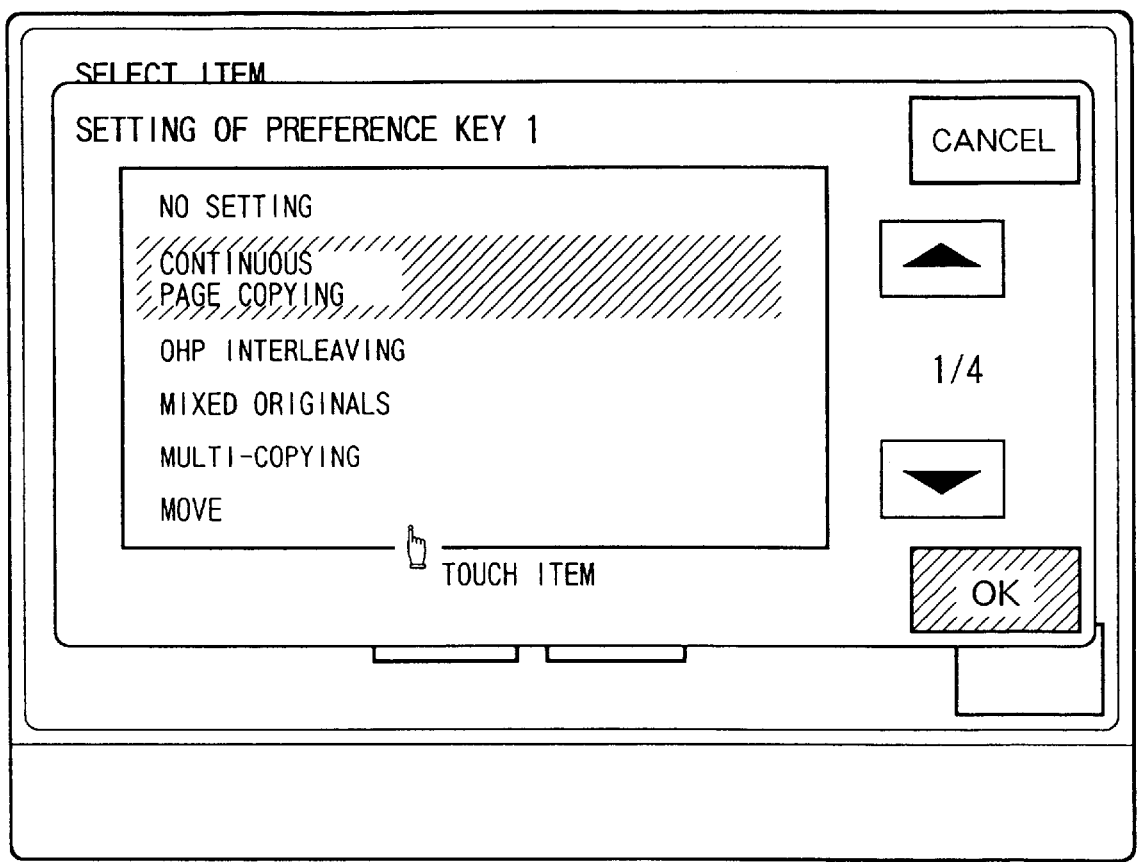
FIGS. 8A and 8B are views showing a preference function setting window and display window in the image forming apparatus.
Figure 8B:
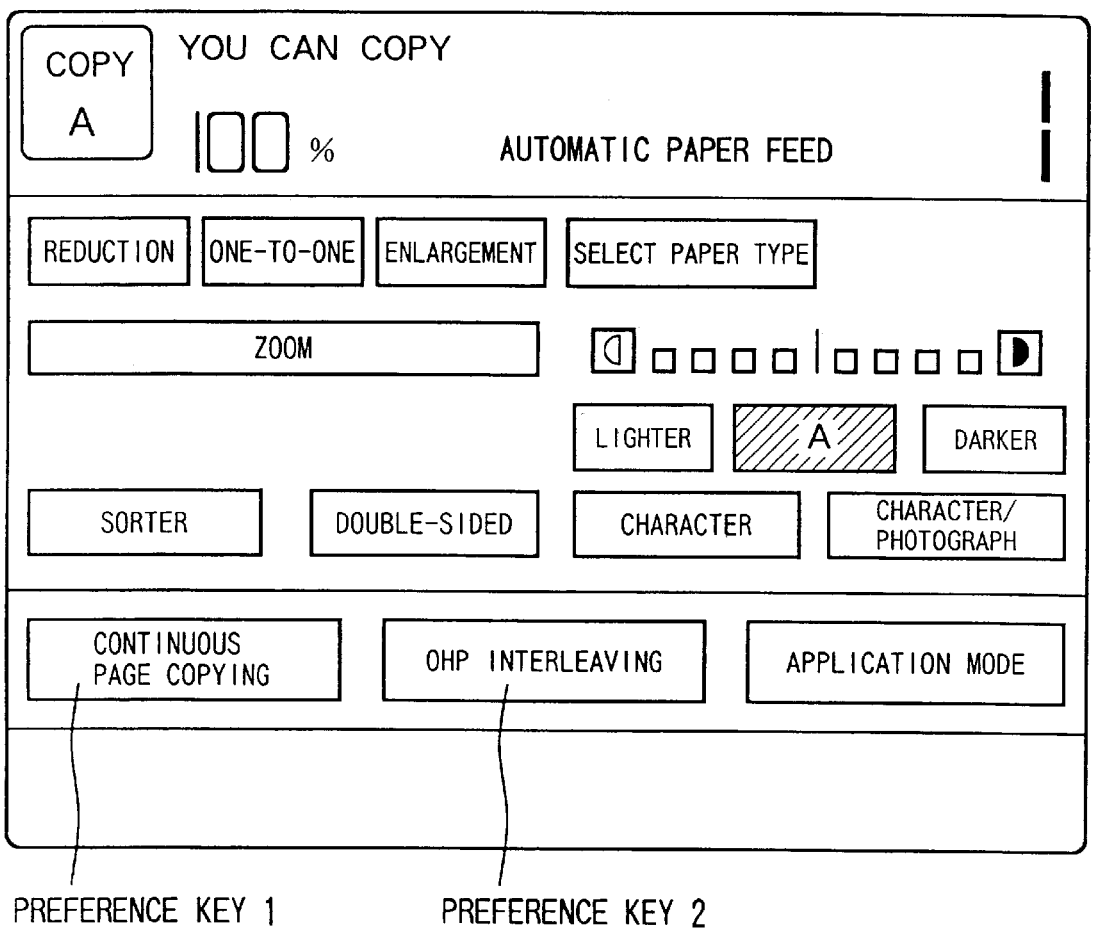

There are keys that can be changed by the user on the side of the application mode key 626 on the display panel 620, as shown in FIG. 8B. A maximum of two function keys that can be set on the application mode setting window can be registered. By displaying setting keys for this application mode at the positions in FIG. 8B, the user can easily set modes to be registered. These keys will be generically called preference function keys. Setting for such keys will be described with reference to FIGS. 8A and 8B.

FIG. 8A shows a window for setting an item corresponding to preference function key 1. The window in FIG. 8A is displayed when the user selects setting of preference function key 1 from setting items upon depressing the user setting key 618. By selecting an item on the window shown in FIG. 8A, and depressing the OK key, the user can select a key corresponding to the function displayed by the preference function key. Then, the new key is displayed on the window, as shown in FIG. 8B.

Referring back to FIG. 6, reference numerals 601 to 612 denote keys and LEDs for switching the settings of the respective functions in copying operation using the image forming apparatus 100, system operation, and displays on the operation unit. The keys 601, 604, 607, and 610 are used to switch the respective functions. These keys are formed from translucent key buttons and have display lamps (not shown) such as LEDs inside. When these keys are depressed, the corresponding operation windows are selected, and the lamps inside the keys are turned on. Of these lamps inside the keys, only the lamp inside the key corresponding to the selected operation function window is turned on, while the lamps in the remaining keys are turned off.

In addition, the green LEDs 603, 606, 609, and 612 are located on the right sides of the respective keys. These LEDs are ON/OFF-controlled to indicate the operation state of the respective functions. For example, the LED 606 for "copy B" 604 is turned off during standby, and flickers while output operation is performed in the copy B mode as shown in FIG. 6. Image data in the copy B mode is stored in the hard disk 404 in the image memory unit 3. The LED 606 is turned on while no printing operation is performed in the copy B mode. Likewise, the LED 609 for "fax" 607 flickers during communication, printing operation, or read, and is turned on while fax image data is stored in the hard disk 502 of the facsimile unit 501.

The red LEDs 602, 605, 608, and 611 are located on the left sides of the respective keys. These LEDs are ON/OFF-controlled to indicate the occurrence of abnormal states in the respective functions. For example, the LED 605 for "copy B" 604 flickers when operation in the copy B mode is interrupted due to a paper-out condition or an abnormality such as a paper jam occurs. In this case, when "copy B" 604 is depressed to switch the display on the operation unit 205 to "copy B", the state of the copy B mode is displayed on the display panel 620, and the user can check the details of the abnormal state. These function switching keys can be depressed, and the operation unit functions can be switched at any time regardless of the operations of the respective functions.

When the copy A function and the copy B function can be switched as in this embodiment, the stop key 615, the start key 614, the reset key 616, and the like, i.e., keys other than the keys on the display panel, are operated with respect to the functions selected with the function switching keys 601 and 604. For example, in the case shown in FIG. 6, even if the stop key 615 is depressed while the copy A operation window is displayed, copying operation in the copy B mode cannot be stopped. The user can stop copying operation in the copy B mode by depressing the stop key 615 after depressing the copy B function key 604. Note that the data set with the interruption key 619 is set for the respective windows on which the copy A and copy B operation unit functions are selected, and can be independently set/operated on the respective windows.

Figure 9:
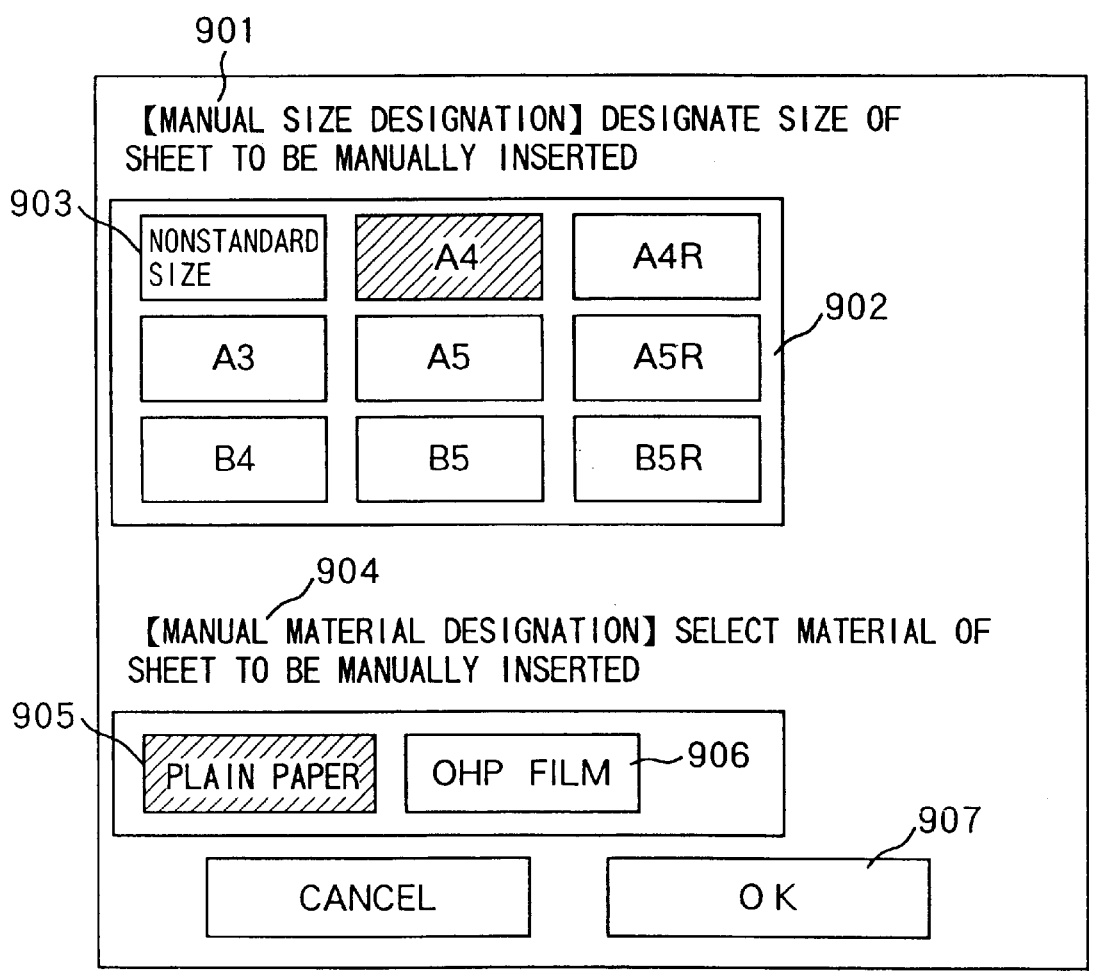
FIG. 9 is a view showing a display window during manual paper feed in this embodiment.

Control to be performed when the user designates the type of paper with the operation unit 205 in feeding a specific transfer sheet from the manual multi insertion unit 153 will be described next. FIG. 9 shows the display window to be displayed on the display panel 620 when a transfer sheet is placed on the manual multi insertion unit 153. As shown in FIG. 9, a key group 902 indicating paper sizes is displayed on a manual insertion size designating portion 901. The user designates the corresponding paper size with this key group. If the transfer sheet corresponds to none of the prescribed paper sizes, the user designates a nonstandard size 903. A key group for designating the type of paper material is displayed on a manual insertion material designating portion 904. For example, this key group includes a plain paper designating key 905 and an OHP sheet designating key 906. Reference numeral 907 denotes an OK key for notifying confirmation of the setting.

Figure 10:
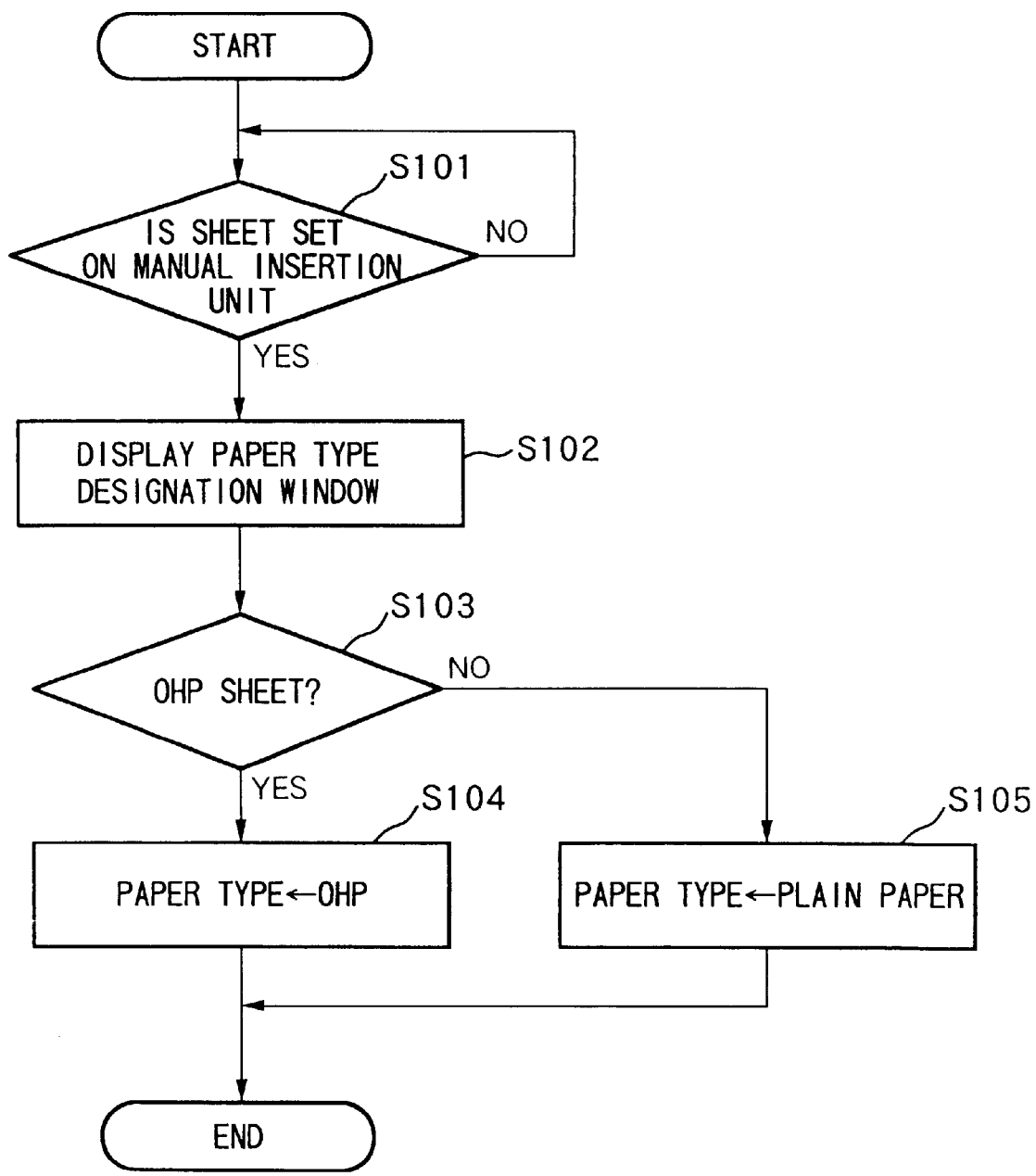
FIG. 10 is a flow chart showing a procedure for setting a paper type in this embodiment.

FIG. 10 is a flow chart showing control to be performed when a transfer sheet is placed on the manual multi insertion unit 153. In step S101, it is checked whether a paper sheet is set on the manual multi insertion unit 153. If YES in step S101, the flow advances to step S102 to cause the display panel 620 to display the paper size and paper type designation windows shown in FIG. 9. In step S103, it is checked whether the designated paper type is OHP. If YES in step S103, the flow advances to step S104 to set a paper type flag indicating "OHP". If plain paper is determined, the flow advances to step S105 to set a paper type flag indicating "plain paper".

Figure 11:
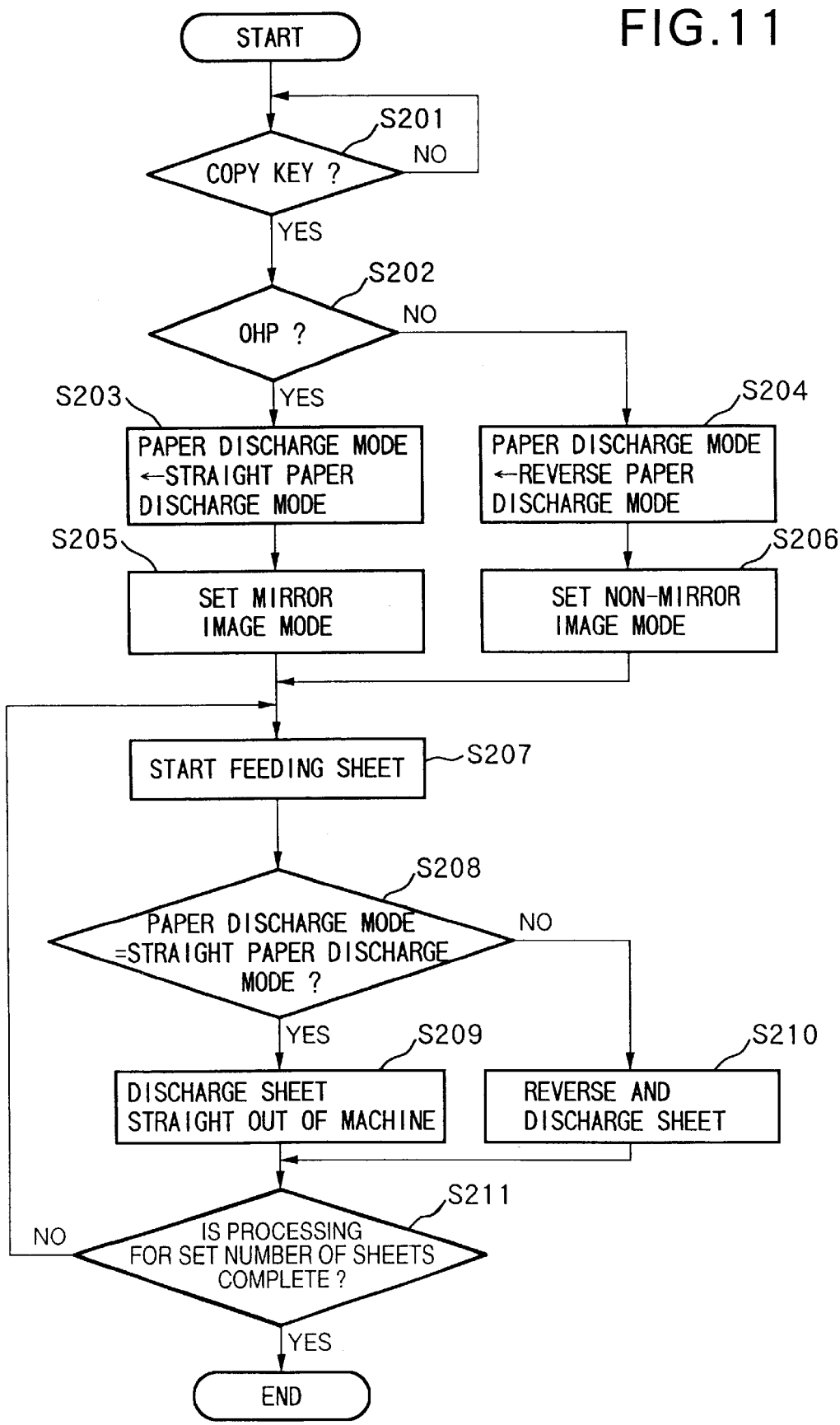
FIG. 11 is a flow chart showing image forming operation in this embodiment.

FIG. 11 is a flow chart showing control to be performed when a transfer sheet is conveyed from the manual multi insertion unit 153 to perform image formation. In step S201, the flow waits until the copy key is depressed. When the copy key is depressed, the flow advances to step S202 to check on the basis of the paper type flag whether type of the paper sheet set on the manual multi insertion unit 153 is "OHP". If YES in step S202, the flow advances to step S203 to set a flag indicating the straight paper discharge mode as a paper discharge mode flag indicating the paper discharge mode of discharging a paper sheet out of the machine. In step S205, the image formation mode is set to the mirror image mode. When the mirror image mode is set in this manner, image information can be processed into a mirror image. If the paper type is not "OHP", the flow advances to step S204 to set a flag indicating a reverse paper discharge mode as a paper discharge mode flag. In step S206, the image formation mode is set to the non-mirror image mode.

When the above setting is complete, the flow advances to step S207 to start feeding a paper sheet from the manual multi insertion unit 153. In step S208, it is checked on the basis of the paper discharge mode flag whether the paper discharge mode is the straight paper discharge mode. If YES in step S208, the flow advances to step S209 to discharge the paper sheet straight out of the machine without turning it upside down. If the reverse paper discharge mode is set, the flow advances to step S210 to discharge the paper sheet out of the machine upon turning it upside down. It is then checked in step S211 whether processing for the set number of paper sheets is complete. If NO in step S211, the flow returns to step S207 to start feeding the next paper sheet.

As described above, according to this embodiment, when a transfer type of sheet is of a special type, image information is converted into mirror image information, and the transfer sheet is output without being turned upside down. With this operation, when image formation processing is to be performed from the start page, paper sheets can be output without being turned upside down. This can therefore adjust the output order without increasing the output time and causing any damage to the output sheets.

Another Embodiment

Another embodiment will be described next, in which when a specific type of transfer sheet is to be fed from a manual multi insertion unit 153, the paper type is detected by a paper type detection means.

Figure 12:
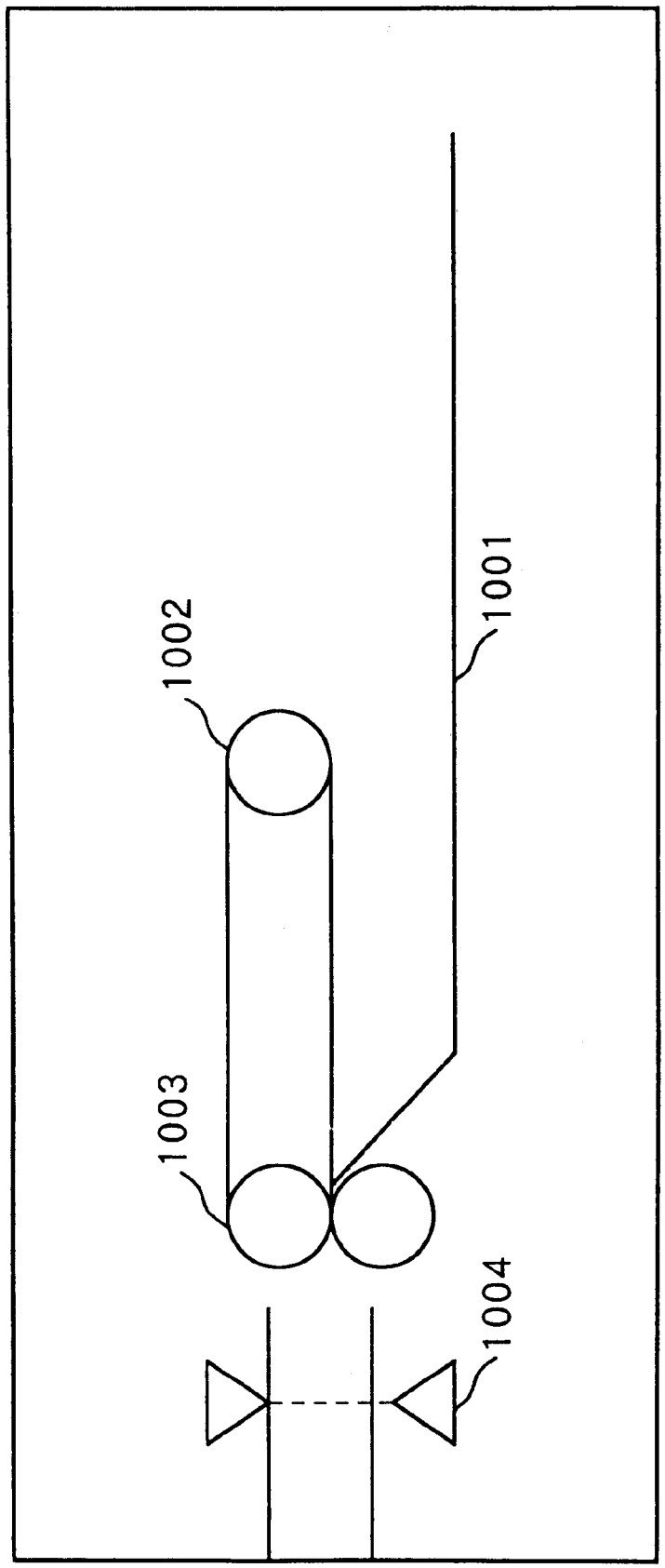
FIG. 12 is a view showing the arrangement of a manual paper feed unit in another embodiment.

FIG. 12 shows the arrangement of a manual paper feed unit in another embodiment. Referring to FIG. 12, reference numeral 1001 denotes a tray on which paper sheets are set; 1002, a pickup roller for feeding paper sheets out of the tray 1001, and 1003, convey rollers for conveying only one of the paper sheets fed by the pickup roller 1002. The convey rollers 1003 are designed not to convey a plurality of paper sheets at once. Reference numeral 1004 denotes a paper type sensor for identifying the type of conveyed paper sheet. The paper type sensor 1004 is a transmission type optical sensor for detecting the type of paper sheet.

This detection is performed at the timing the paper sheet fed from the convey rollers 1003 passes through the paper type sensor 1004. The paper type is then determined on the basis of the output from the paper type sensor 1004. If, for example, the output from the paper type sensor 1004 is in an ON state (in which light is transmitted), it is determined that the paper sheet is a transparent sheet, i.e., an OHP sheet. If the output from the paper type sensor 1004 is in an OFF state (in which light is blocked), it is determined that the paper sheet is a non-transparent or opaque sheet.

Figure 13:
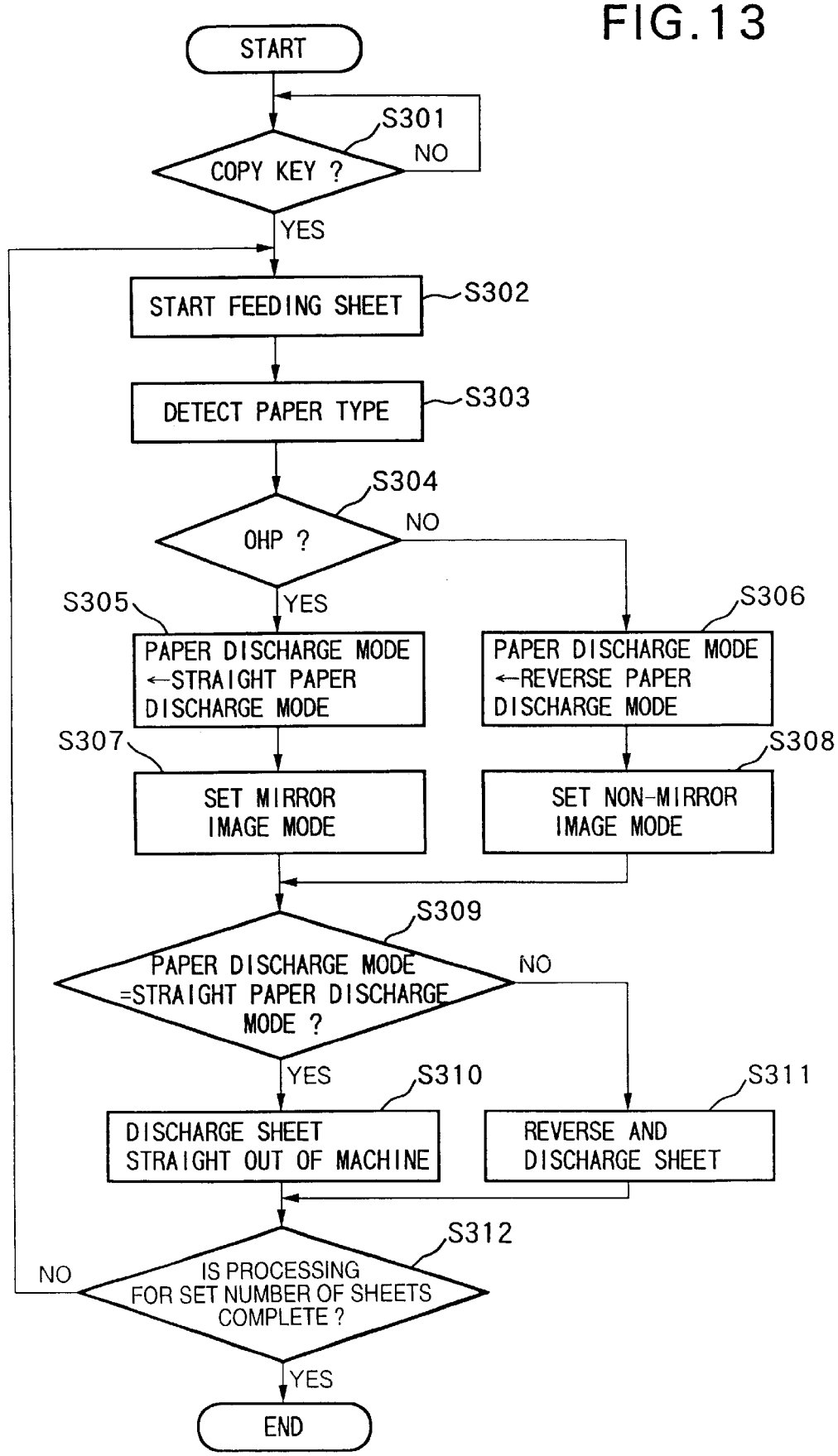
FIG. 13 is a flow chart showing image forming operation in another embodiment.

FIG. 13 is a flow chart showing control to be performed when a transfer sheet is conveyed from the manual multi insertion unit 153, and an image is formed on the sheet. In step S301, the flow waits until the copy key is depressed. When the copy key is depressed, the flow advances to step S302 to start feeding a paper sheet from the manual multi insertion unit 153. In step S303, the type of paper sheet is detected at a predetermined timing by the paper type sensor 1004 to check whether the type of paper sheet is an OHP sheet. If the type of paper sheet is an OHP sheet, the flow advances to step S305 to set a flag indicating the straight paper discharge mode as a paper discharge mode flag. In step S307, the mirror image mode is set as an image formation mode. If the type of paper sheet is other than an OHP sheet, the flow advances to step S306 to set a flag indicating the reverse paper discharge mode as a paper discharge mode flag. In step S308, the non-mirror image mode is set as an image formation mode.

The flow then advances to step S309 to check whether the paper discharge mode is the straight paper discharge mode when an image is formed by a printer unit 2 on the transfer sheet, and the transfer sheet reaches the paper discharge unit. If the straight paper discharge mode is determined, the flow advances to step S310 to discharge the sheet straight out of the machine. If the paper discharge mode is the reverse paper discharge mode, the flow advances to step S311 to reverse and discharge the sheet. In step S312, it is checked whether processing for the set number of sheets is complete. If NO in step S312, the flow returns to step S302 to start feeding the next sheet.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

In this embodiment, a mode (to be referred to as an OHP interleaving mode hereinafter) of inserting interleaving paper (plain paper) between OHP sheets to be output can be set. In this case, the "OHP interleaving key" of the application function mode setting keys shown in FIG. 7 is used. In the OHP interleaving mode, the user can choose between copying on interleaving paper or not copying. The OHP interleaving mode will be described with reference to FIG. 14.

Assume that a plurality of OHP sheets are set on the manual multi insertion unit 153, and a plurality of sheets of plain paper having the same size as that of the OHP sheet are set on an upper or lower cassette 131 or 132. In this case, in the OHP interleaving mode, when copying is started, one OHP sheet is discharged first upon copying, and then one sheet of plain paper is discharged. Subsequently, one OHP sheet and one sheet of plain paper are alternately discharged. That is, in continuously copying images on a plurality of OHP sheets, sheets of plain paper are inserted between the respective OHP sheets.

The above function is aimed at preventing a plurality of OHP sheets, which are electrostatically charged during copying when directly output, from sticking to each other, and also making the interleaving paper protect the surfaces of the OHP sheets.

Figure 14:
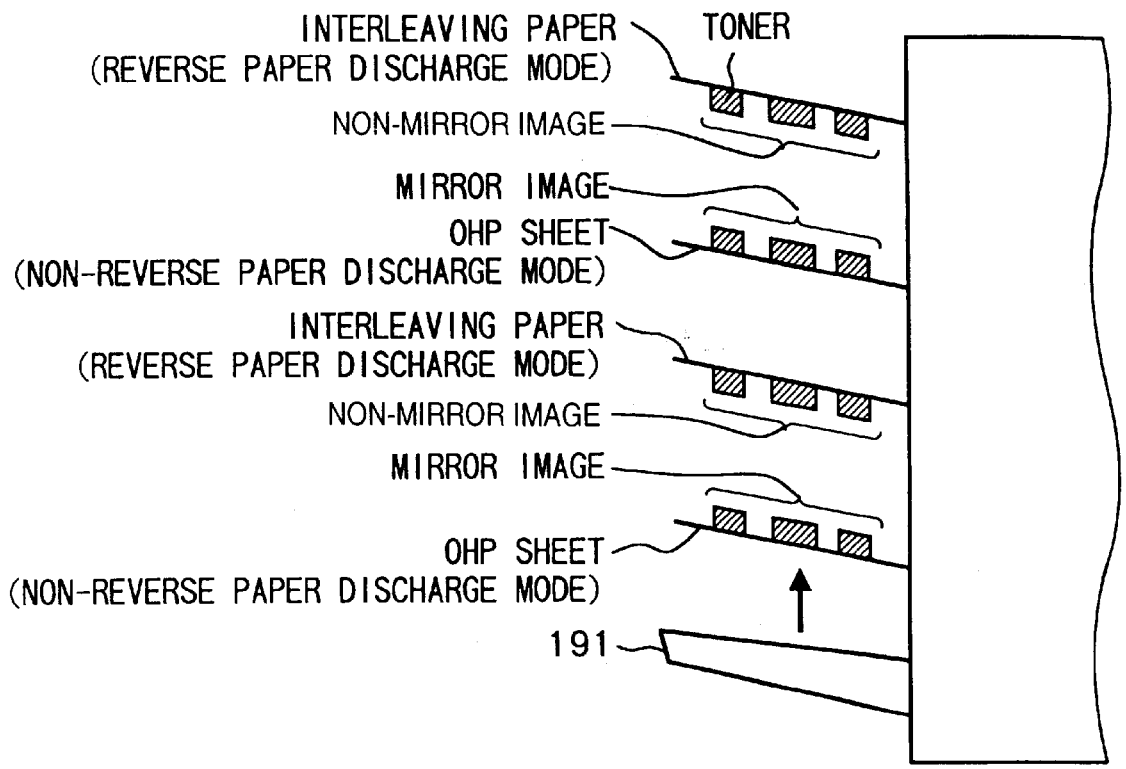
FIG. 14 is a view for explaining an OHP interleaving mode.

FIG. 14 shows the state of a paper discharge tray 191 after copying in the OHP interleaving mode. Sheets of plain paper as interleaving paper need not be output as blank sheets, and the same images as those copied on OHP sheets may be copied on the interleaving paper.

FIG. 14 shows a case wherein when two originals are copied on OHP sheets, interleaving paper is inserted between the OHP sheets while the same images as those on the OHP sheets are copied on the interleaving paper.

In this embodiment, when a type of sheet on which an image is to be formed is a transparent sheet, i.e., an OHP sheet, a mirror image is formed on the OHP sheet, and the OHP sheet on which the mirror image is formed is discharged without reversing. In addition, when a type of sheet on which an image is to be formed is an opaque sheet, i.e., plain paper, a non-mirror image, i.e., an erect image, is formed on the plain paper, and the plain paper on which the non-mirror image is formed is reversed and discharged. As shown in FIG. 14, therefore, the surface of each OHP sheet on which a toner image is formed differs from the surface of each sheet of plain paper on which a toner image is formed.

Figure 15:
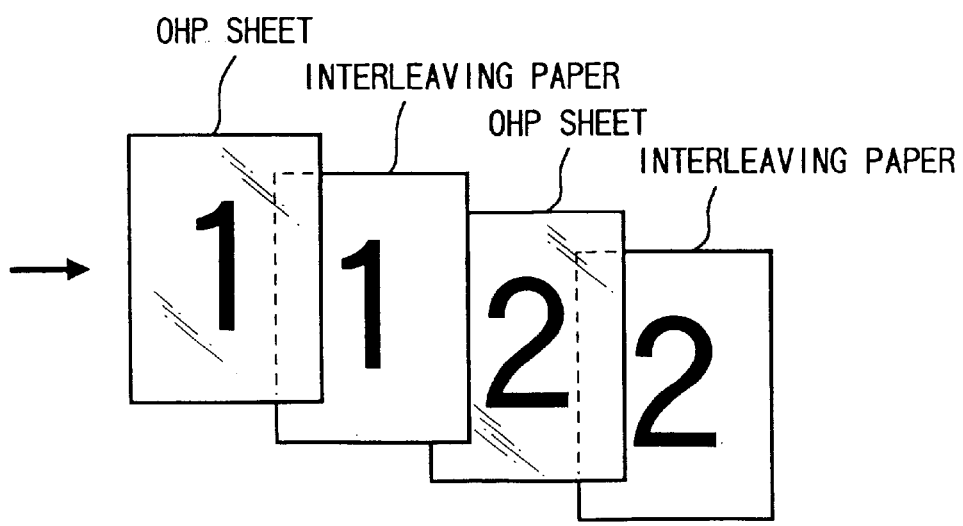
FIG. 15 is a view for explaining the OHP interleaving mode.

Since OHP sheets are transparent sheets, when the user sees the copies in the direction indicated by the arrow in FIG. 14, the images formed on the OHP sheets and sheets of plain paper look overlapped as shown in FIG. 15. Therefore, the user need not reverse these sheets such that the images formed on the OHP sheets and interleaving paper (plain paper) are overlapped on each other.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   image forming means for forming an image on a sheet, said image forming apparatus being selectively operable in either a first mode that discharges the sheet from said image forming means via a reversing unit for inverting the sheet or a second mode that discharges the sheet from said image forming means by bypassing the reversing unit; and
   a control device configured to set the first mode when a sheet to be processed by said image forming means is a first sheet type, and configured to control said image forming means to form a mirror image of the image on a second sheet type and to select the second mode when image formation is determined to occur on the second sheet type.

2. An image forming apparatus having image forming means for forming an image on a sheet, said image forming apparatus being selectively operable in either a first mode that discharges the sheet from said image forming means via a reversing unit for inverting the sheet or a second mode that discharges the sheet from said image forming means by bypassing the reversing unit, said apparatus comprising:

a control device configured to set the first mode when a sheet to be processed by said image forming means is a first sheet type, and configured to control said image forming means to form a mirror image of the image on a second sheet type and to select the second mode when image formation is determined to occur on the second sheet type.

3. The apparatus according to claim 2, further comprising designation means for designating a sheet type on which an image is to be formed, wherein said control device performs control according to the sheet type designated by said designation means.

4. The apparatus according to claim 2, further comprising detection means for detecting a sheet type on which an image is to be formed, wherein said control device performs control according to the sheet type detected by said detection means.

5. The apparatus according to claim 2, wherein said image forming means forms an image by reading an original image on a sheet by read means.

6. The apparatus according to claim 2, wherein said image forming means forms an image from an external device on the sheet.

7. The apparatus according to claim 2, wherein said image forming means forms a series of images consisting of a plurality of pages in order from a head page.

8. The apparatus according to claim 7, further comprising stacking means for stacking, on condition that page order is maintained, formed and discharged sheets in order from a head page by said image forming means.

9. The apparatus according to claim 2, wherein the first sheet type includes an opaque sheet and the second sheet type includes a transparent sheet.

10. An image forming apparatus having image forming means for forming an image on a sheet, said image forming apparatus being selectively operable in either a first mode that discharges the sheet from said image forming means via a reversing unit for inverting the sheet or a second mode that discharges the sheet from said image forming means by bypassing the reversing unit, said apparatus comprising:

a control device configured to set the first mode when a sheet to be processed by said image forming means is a first sheet type, and configured to control the image forming means to form a mirror image of the image on a second sheet type and to inhibit execution of the first mode when image formation is determined to occur on the second sheet type.

11. The apparatus according to claim 10, further comprising designation means for designating a type sheet on which an image is to be formed, wherein said control device performs control according to the sheet type designated by said designation means.

12. The apparatus according to claim 10, further comprising detection means for detecting the type of sheet on which an image is to be formed, wherein said control device performs control according to the sheet type detected by said detection means.

13. The apparatus according to claim 10, wherein said image forming means forms an image by reading an original image on a sheet by read means.

14. The apparatus according to claim 10, wherein said image forming means forms an image from an external device on the sheet.

15. The apparatus according to claim 10, wherein said image forming means forms a series of images consisting of a plurality of pages in order from a head page.

16. The apparatus according to claim 15, further comprising stacking means for stacking, on condition that page order is maintained, formed and discharged sheets in order from a head page by said image forming means.

17. The apparatus according to claim 10, wherein the first sheet type includes an opaque sheet and the second sheet type includes a transparent sheet.

18. A method of controlling an image forming apparatus having image forming means for forming an image on a sheet, and being selectively operable in either a first mode that discharges the sheet from the image forming means via a reversing unit for inverting the sheet or a second mode that discharges the sheet from the image forming means by bypassing the reversing unit, said method comprising:

a control step of (i) setting the first mode when a sheet to be processed by the image forming means is a first sheet type, and (ii) controlling the image forming means to form a mirror image of the image on a second sheet type and selecting the second mode when image formation is determined to occur on the second sheet type.

19. The apparatus according to claim 18, further comprising a designation step of designating a sheet type on which an image is to be formed, wherein in said control step, control is performed according to the sheet type designated in said designation step.

20. The apparatus according to claim 18, further comprising a detection step of detecting a sheet type on which an image is to be formed, wherein in said control step, control is performed according to the sheet type detected in said detection step.

21. The apparatus according to claim 18, wherein the image forming means forms an image by reading an original image on a sheet by read means.

22. The apparatus according to claim 18, wherein the image forming means forms an image from an external device on the sheet.

23. The apparatus according to claim 18, wherein said image forming means forms a series of images consisted of a plurality of pages in order from a head page.

24. The apparatus according to claim 23, wherein the image forming apparatus further comprises stacking means for stacking, on condition that page order is maintained, formed and discharged sheets in order from a head page by the image forming means.

25. The apparatus according to claim 18, wherein the first sheet type includes an opaque sheet and the second sheet type includes a transparent sheet.

26. A method of controlling an image forming apparatus having image forming means for forming an image on a sheet, and being selectively operable in either a first mode that discharges the sheet from the image forming means via a reversing unit for inverting the sheet or a second mode that discharges the sheet from the image forming means by bypassing the reversing unit, said method comprising:

a control step of setting the first mode when a sheet to be processed by the image forming means is a first sheet type, and of controlling the image forming means to form a mirror image of the image on a second sheet type and inhibiting execution of the first mode when image formation is determined to occur on the second sheet type.

27. The apparatus according to claim 26, further comprising a designation step of designating a type sheet on which an image is to be formed, wherein in said control step, control is performed according to the type sheet designated in said designation step.

28. The apparatus according to claim 26, further comprising a detection step of detecting a sheet type on which an image is to be formed, wherein in said control step, control is performed according to the sheet type detected in said detection step.

29. The apparatus according to claim 26, wherein the image forming means forms an image by reading an original image on a sheet by read means.

30. The apparatus according to claim 26, wherein the image forming means forms an image from an external device on the sheet.

31. The apparatus according to claim 26, wherein the image forming means forms a series of images consisting of a plurality of pages in order from a head page.

32. The apparatus according to claim 31, wherein the image forming apparatus further comprises stacking means for stacking, on condition that page order is maintained, formed and discharged sheets in order from a head page by the image forming means.

33. The apparatus according to claim 26, wherein the first sheet type includes an opaque sheet and the second sheet type includes a transparent sheet.

34. A computer-readable storage medium that stores a program for controlling an image forming apparatus having image forming means for forming an image on a sheet, and being selectively operable in either a first mode that discharges the sheet from the image forming means via a reversing unit for inverting the sheet or a second mode that discharges the sheet from the image forming means by bypassing the reversing unit, said program controlling the image forming apparatus to execute:

a control step of setting the first mode when a sheet to be processed by the image forming means is a first sheet type, and of controlling the image forming means to form a mirror image of the image on a second sheet type and selecting the second mode when image formation is determined to occur on the second sheet type.

35. The medium according to claim 34, wherein the program causes the image forming apparatus to execute a designation step of designating a sheet type on which an image is to be formed, and said program causes said control step to perform control according to the type of sheet designated in said designation step.

36. The medium according to claim 34, wherein the program causes the image forming apparatus to execute a detection step of detecting a sheet type on which an image is to be formed, and wherein the program controls said control step to perform control according to the sheet type detected in said detection step.

37. The medium according to claim 34, wherein the image forming means forms an image by reading an original image on a sheet by read means.

38. The medium according to claim 34, wherein the image forming means forms an image from an external device on the sheet.

39. The medium according to claim 34, wherein the image forming means forms a series of images consisting of a plurality of pages in order form a head page.

40. The medium according to claim 39, wherein the image forming apparatus further comprises stacking means for stacking, on condition that page order is maintained, formed and discharged sheets in order from a head page by said image forming means.

41. The medium according to claim 34, wherein the first sheet type includes an opaque sheet and the second sheet type includes a transparent sheet.

42. A computer-readable storage medium that stores a program for controlling an image forming apparatus having image forming means for forming an image on a sheet, and being selectively operable in either a first mode that discharges the sheet from the image forming means via a reversing unit for inverting the sheet or a second mode that discharges the sheet from the image forming means by bypassing the reversing unit, the program controlling the image forming apparatus to execute:

a control step of setting the first mode when a sheet to be processed by the image forming means is a first sheet type, and of controlling the image forming means to form a mirror image of the image on a second sheet type and inhibiting execution of the first mode when image formation is determined to occur on the second sheet type.

43. The medium according to claim 34, wherein the program causes the image forming apparatus to execute a designation step of designating a type sheet on which an image is to be formed, and wherein the program controls said control step to perform control according o the type sheet designated in said designation step.

44. The medium according to claim 34, wherein the program causes the image forming apparatus to execute a detection step of detecting a sheet type on which an image is to be formed, and wherein the program controls said control step to perform control according to the type sheet detected in said detection step.

45. The medium according to claim 42, wherein said image forming means forms an image by reading an original image on a sheet by read means.

46. The medium according to claim 42, wherein said image forming means forms an image from an external device on the sheet.

47. The medium according to claim 42, wherein said image forming means forms a series of images consisting of a plurality of pages in order from a head page.

48. The medium according to claim 47, wherein said image forming apparatus further comprises stacking means for stacking on condition that page order is maintained, formed and discharged sheets in order from a head page by said image forming means.

49. The medium according to claim 42, wherein the first sheet type includes an opaque sheet and the second type sheet includes a transparent sheet.

* * * * *

UNITED STATES PATENT AND TRADEMARK OFFICE
CERTIFICATE OF CORRECTION

PATENT NO. : 6,236,815 B1
DATED : May 22, 2001
INVENTOR(S) : Tokuharu Kaneko et al.

Page 1 of 1

It is certified that error appears in the above-identified patent and that said Letters Patent is hereby corrected as shown below:

Column 1,
Line 19, "machines" should read -- machine --.

Column 8,
Line 30, "copy B"." should read -- "copy B" is displayed. --.

Column 14,
Line 50, "consisted" should read -- consisting --.

Column 16,
Line 6, "form" should read -- from --;
Line 31, "claim 34," should read -- claim 42, --;
Line 35, "o" should read -- to --;
Line 36, "sheet" should read -- of sheet --;
Line 37, "claim 34," should read -- claim 42, --;
Lines 41 and 58, "type" should read -- type of --.

Signed and Sealed this

Ninth Day of April, 2002

Attest:

JAMES E. ROGAN
*Attesting Officer*  *Director of the United States Patent and Trademark Office*